US012502659B2

(12) United States Patent
Kim et al.

(10) Patent No.: US 12,502,659 B2
(45) Date of Patent: Dec. 23, 2025

(54) PHOTOELECTROCHEMICAL AND ELECTROCHEMICAL METAL CATALYST AND METHOD OF PREPARING THE SAME

(71) Applicants: Research & Business Foundation SUNGKYUNKWAN UNIVERSITY, Suwon (KR); Industry-academic Cooperation Foundation, YONSEI UNIVERSITY, Seoul (KR)

(72) Inventors: Jung Kyu Kim, Suwon (KR); Jong Hyeok Park, Seoul (KR); Won Tae Hong, Suwon (KR); Sung Soon Kim, Seoul (KR)

(73) Assignees: RESEARCH & BUSINESS FOUNDATION SUNGKYUNKWAN UNIVERSITY, Suwon (KR); INDUSTRY-ACADEMIC COOPERATION FOUNDATION YONSEI UNIVERSITY, Seoul (KR)

( * ) Notice: Subject to any disclaimer, the term of this patent is extended or adjusted under 35 U.S.C. 154(b) by 663 days.

(21) Appl. No.: 17/951,564

(22) Filed: Sep. 23, 2022

(65) Prior Publication Data

US 2023/0226529 A1    Jul. 20, 2023

(30) Foreign Application Priority Data

Sep. 23, 2021  (KR) .................. 10-2021-0125602

(51) Int. Cl.

| B01J 27/185 | (2006.01) |
|---|---|
| B01J 35/30 | (2024.01) |
| B01J 35/33 | (2024.01) |
| B01J 37/34 | (2006.01) |
| C02F 1/461 | (2023.01) |

(Continued)

(52) U.S. Cl.
CPC .......... B01J 27/1853 (2013.01); B01J 35/33 (2024.01); B01J 35/391 (2024.01); B01J 37/348 (2013.01); C02F 1/46109 (2013.01); C02F 1/4672 (2013.01); C02F 2001/46142 (2013.01); C02F 2101/16 (2013.01)

(58) Field of Classification Search
CPC ...... B01J 27/1853; B01J 35/33; B01J 35/391; B01J 37/348; C02F 1/46109; C02F 1/4672; C02F 2001/46142; C02F 2101/16; Y02P 20/13; Y02W 10/37
See application file for complete search history.

(56) References Cited

FOREIGN PATENT DOCUMENTS

| CN | 108217750 A | * | 6/2018 | ............. B82Y 40/00 |
|---|---|---|---|---|
| CN | 107790131 B | * | 2/2020 | ............. B01J 37/10 |
| KR | 102123618 | | 6/2020 | |

OTHER PUBLICATIONS

Machine translation of Meng et al. (Year: 2018).*

(Continued)

Primary Examiner — Brian A McCaig
(74) Attorney, Agent, or Firm — LEX IP MEISTER, PLLC

(57) ABSTRACT

There is provided a method of preparing a photoelectrochemical and electrochemical electrode catalyst, the method including preparing a metal oxide-based electrode, introducing a phosphate layer on a surface of the metal oxide-based electrode; and converting the phosphate layer into an oxyhydroxide layer by performing electrochemical activation on the phosphate layer.
The efficiency of selective oxidation reaction of ammonia in wastewater may be improved.

13 Claims, 13 Drawing Sheets

(51) Int. Cl.
    *C02F 1/467*     (2023.01)
    *C02F 101/16*    (2006.01)

(56) References Cited

OTHER PUBLICATIONS

Machine translation of Huang et al. (Year: 2020).*
Zhang, et al., "Ultrathin FeOOH Nanolayers with Abundant Oxygen Vacancies on BiVO4 Photoanodes for Efficient Water Oxidation", Angew. Chem. Int. Ed. 2018, 5 pages.
Wei, et al., "Room Temperature Surface Modification of Ultrathin FeOOH Cocatalysts on Fe2O3 Photoanodes for High Photoelectrochemical Water Splitting", Hindawi Journal of Nanamaterials, vol. 2020, 8 pages.

* cited by examiner

PHOTOELECTROCHEMICAL AND ELECTROCHEMICAL METAL CATALYST AND METHOD OF PREPARING THE SAME

CROSS REFERENCE TO RELATED APPLICATION

The present application claims priority to Korean Patent Application No. 10-2021-0125602, filed Sep. 23, 2021, the entire contents of which is incorporated herein for all purposes by this reference.

BACKGROUND OF THE INVENTION

Field of the Invention

The present invention relates to an electrode including a metal oxide-based electrode and a metal phosphate thin film layer disposed on a surface thereof, and more particularly to, a metal oxide-based electrode catalyst with high efficiency in decomposition reaction of ammonia within an aqueous solution.

Description of the Related Art

In order to reuse water resources, there is a growing demand for technologies that can efficiently remove ammonia in wastewater, which is a persistent pollutant, but existing ammonia removal methods, such as air stripping, breakpoint chlorination, ion exchange, biological nitrification-denitrification, and ozone treatment, generally have low ammonia removal efficiency.

Conventionally, according to a biological nitrogen removal method (biological nitrification-denitrification), when the concentration of ammonia in wastewater is high, aerobic and anaerobic activity of bacteria is suppressed, and the air stripping, which is a method of converting ammonium ions in wastewater into gaseous ammonia, is not economical due to low efficiency and large power consumption in winter.

Accordingly, a water treatment method using an electrochemical ammonia oxidation reaction of a similar process to oxidation reaction of water ($H_2O$) has been attracting attention. However, in a decomposition reaction process by the ammonia oxidation reaction, contrary to the expectation that the ammonia oxidation reaction will show high energy conversion efficiency due to a low oxidation potential value, the conventional electrochemical method has a limitation in that it requires a high polarization potential in order to obtain a stable response current.

In addition, when a general metal electrode is used as an electrode for a decomposition reaction, since the general metal electrode does not have a band gap, which is a characteristic of a semiconductor, an oxidation reaction occurs depending on an external power, and accordingly, there is a limit in that a high overpotential is required.

Therefore, there is a need for a method for decomposing ammonia in wastewater, which increases the efficiency by inducing a decomposition reaction by selective oxidation reaction for ammonia and at the same time improves economic efficiency by reducing power to be applied.

Documents of Related Art (Patent Document 1) KR Patent Publication No. 10-2019-0122036A

SUMMARY OF THE INVENTION

Therefore, the present invention has been made to address the above problems, and it is an object of the present invention to provide a photoelectrochemical and electrochemical electrode catalyst that induces a photoelectrochemical oxidation reaction capable of efficiently removing ammonia in wastewater.

The technical object to be achieved by the present invention is not limited to the above-described technical object, and other technical objects that are not mentioned will be clearly understood by those of ordinary skilled in the art from the following description.

To accomplish the above object, according to one aspect of the present invention, there is provided a method of preparing a photoelectrochemical and electrochemical electrode catalyst, the method including: preparing a metal oxide-based electrode; introducing a phosphate layer on a surface of the metal oxide-based electrode; and converting the phosphate layer into an oxyhydroxide layer by performing electrochemical activation on the phosphate layer.

In an embodiment of the present invention, the metal oxide may include iron oxide.

In addition, the iron oxide may have a rhombohedral structure.

In addition, in an embodiment of the present invention, the oxyhydroxide layer may have a thickness of 1 nm to 10 nm.

In addition, in an embodiment of the present invention, the phosphate layer may include an iron phosphate layer.

In addition, in an embodiment of the present invention, the phosphate layer may include an amorphous structure.

In addition, in an embodiment of the present invention, the oxyhydroxide layer may include iron oxyhydroxide.

In addition, in an embodiment of the present invention, the oxyhydroxide layer may include a disordered amorphous structure.

To accomplish the above technical object, according to another aspect of the present invention, there is provided a photoelectrochemical and electrochemical electrode catalyst including: a metal oxide-based electrode; and an oxyhydroxide layer disposed on a surface of the electrode.

In an embodiment of the present invention, the oxyhydroxide layer may have a thickness of 1 nm to 10 nm.

In addition, in an embodiment of the present invention, the metal oxide-based electrode may include iron oxide.

In addition, the iron oxide may have a rhombohedral structure.

In addition, in an embodiment of the present invention, the oxyhydroxide layer may include iron oxyhydroxide.

In addition, in an embodiment of the present invention, the oxyhydroxide layer may include a disordered amorphous structure.

DETAILED DESCRIPTION OF THE INVENTION

Figure 1:
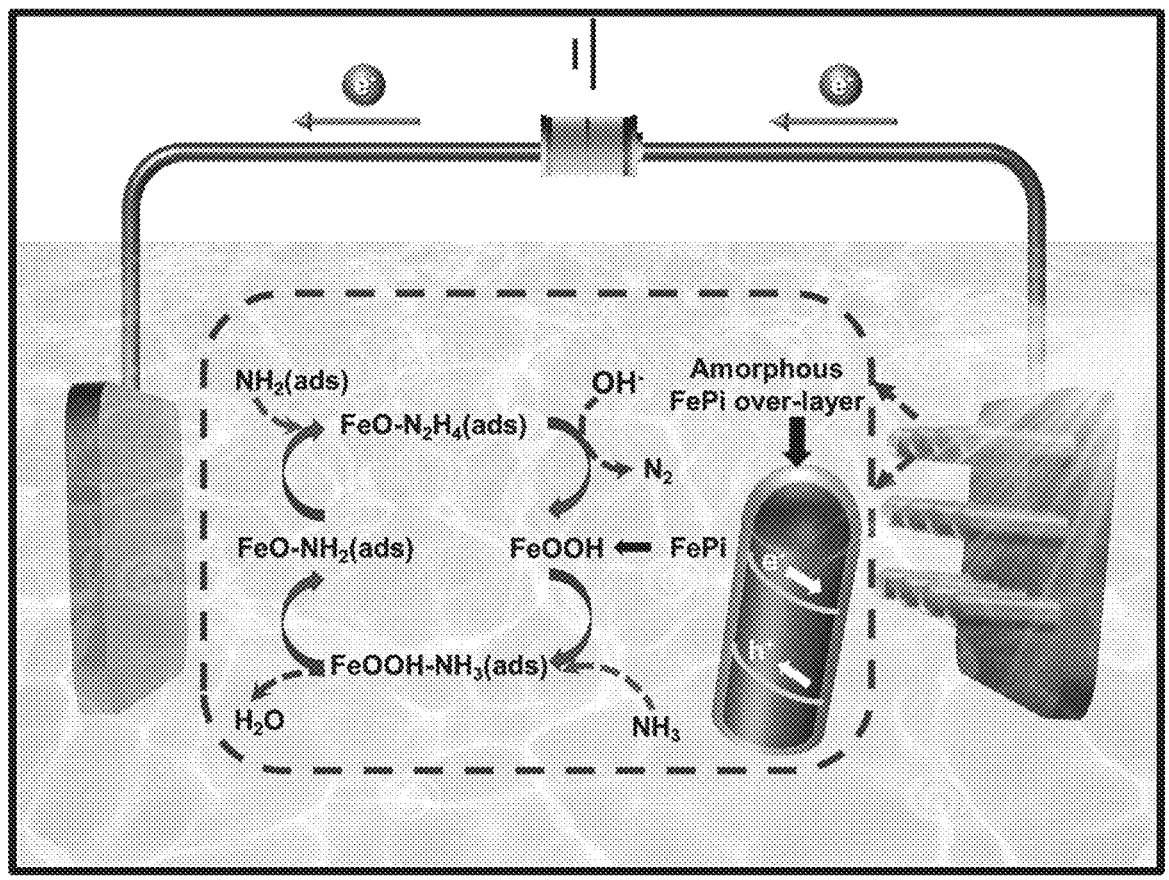
FIG. 1 is a diagram illustrating ammonia photoelectrolysis reaction of A-FePi/$Fe_2O_3$ photoelectrochemical and electrochemical electrode catalyst, according to an embodiment of the present invention.

In the following description, the present invention is described with reference to the accompanying drawings. However, the present invention may be implemented in various forms, and thus, is not limited to embodiments described herein. In addition, irrelevant descriptions are omitted to clearly explain the present invention, and throughout the specification, the same or corresponding elements are indicated by the same reference numerals.

Throughout the specification, when a portion is connected (accessed, contacted, or coupled) with other portions, it includes direction connection as well as indirect connection in which the other member is positioned therebetween. Furthermore, throughout the specification, when a portion "includes" an element, another element may be further included, rather than excluding the existence of the other element, unless otherwise described.

The terms used in the present specification are merely used to describe particular embodiments, and are not intended to limit the inventive concept. The expression of singularity in the specification includes the expression of plurality unless clearly specified otherwise in context. In the present specification, it is to be understood that the terms such as "including," "having," and "comprising" are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

The expression "B/A-based electrode" used in the present specification is to be understood as a form in which a B material is deposited on an A-based electrode.

To solve the shortcomings of the related art, in an embodiment of the present invention, there is provided a photoelectrochemical and electrochemical electrode catalyst including a metal oxide-based electrode and an oxyhydroxide layer positioned on a surface of the electrode.

At this time, the oxyhydroxide layer is formed through a step of introducing an amorphous phosphate layer, and the oxyhydroxide layer is realized to have a disordered amorphous structure on the surface of the electrode through the amorphous phosphate layer, and increases the selectivity of ammonia oxidation reaction through the disordered amorphous structure.

An ammonia oxidation reaction process is described using a photoelectrochemical and electrochemical electrode catalyst provided by an embodiment of the present invention.

FIG. 1 is a diagram illustrating photoelectrochemical ammonia decomposition reaction or a A-FePi/Fe$_2$O$_3$ photoelectrochemical and electrochemical electrode catalyst, according to an embodiment, and hereinafter, a reaction process of the photoelectrochemical ammonia decomposition reaction is described with reference to FIG. 1.

As shown in FIG. 1, according to an embodiment of the present invention, when an amorphous iron phosphate (FePi) layer is introduced on a surface of a Fe$_2$O$_3$-based electrode used for ammonia oxidation reaction, followed by conversion into an iron oxyhydroxide (FeOOH) layer through an electrochemical activation process, the iron oxyhydroxide layer provides an active site where aqueous ammonia may be effectively adsorbed, thereby forming FeOOH—NH$_3$ (ads). Afterwards, a dehydration reaction proceeds in an aqueous solution state, a reaction proceeds to FeO—NH$_2$ (ads), and then a reaction proceeds again to FeO—N$_2$H$_4$ (ads). After the above process, a reaction with OH— in the solution proceeds, and finally, a separate halogen intermediate does not participate in the reaction, and the photoelectrochemical ammonia oxidation reaction in which only nitrogen is produced is effectively terminated.

In an embodiment of the present invention, the metal oxide-based electrode may include a transition metal oxide-based electrode and a metal oxide-based electrode including iron (Fe) may be used. However, the present invention is not limited to iron (Fe), and any known metal used for a transition metal oxide may be used without limitation.

In addition, iron oxide ($\alpha$-$Fe_2O_3$) is not toxic, consists of elements abundant in the earth's crust, and has high photochemical stability, a narrow band gap (1.9 eV to 2.2 eV), and an appropriate electronic band structure, and thus, is a suitable material as a photoelectrochemical water-splitting electrode, and thus, the metal oxide-based electrode including iron may be an electrode including iron oxide, and desirably, the iron oxide may include iron oxide having a rhombohedral structure. However, the present invention is not limited to the iron oxide and not limited to the rhombohedral structure. In addition, in consideration of the toxicity of the material, the electrical characteristics of the material, and the economic efficiency of the material, a transition metal oxide compound for providing an effect of the present invention should be interpreted as being included in the scope of the present invention.

Figure 2:
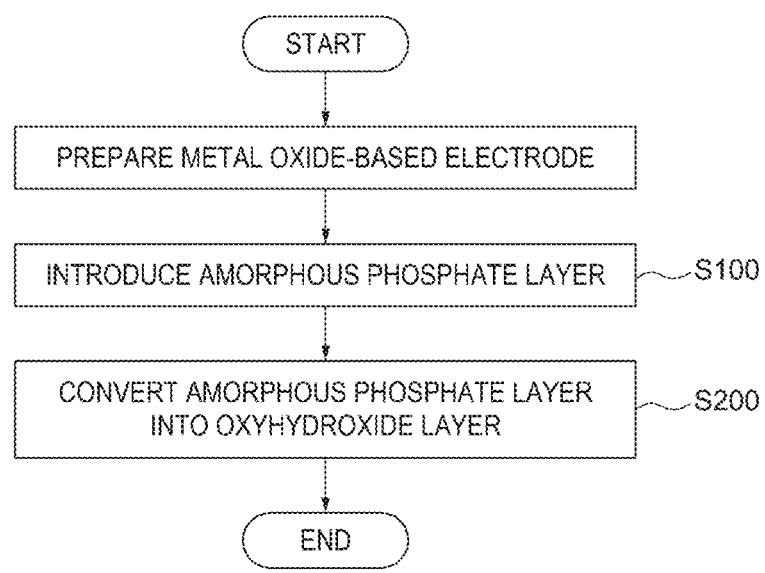
FIG. 2 is a diagram schematizing a method of preparing a photoelectrochemical and electrochemical electrode catalyst, according to an embodiment of the present invention.

FIG. 2 is a diagram schematizing a method of preparing a photoelectrochemical and electrochemical electrode catalyst, according to an embodiment of the present invention.

Figure 3:
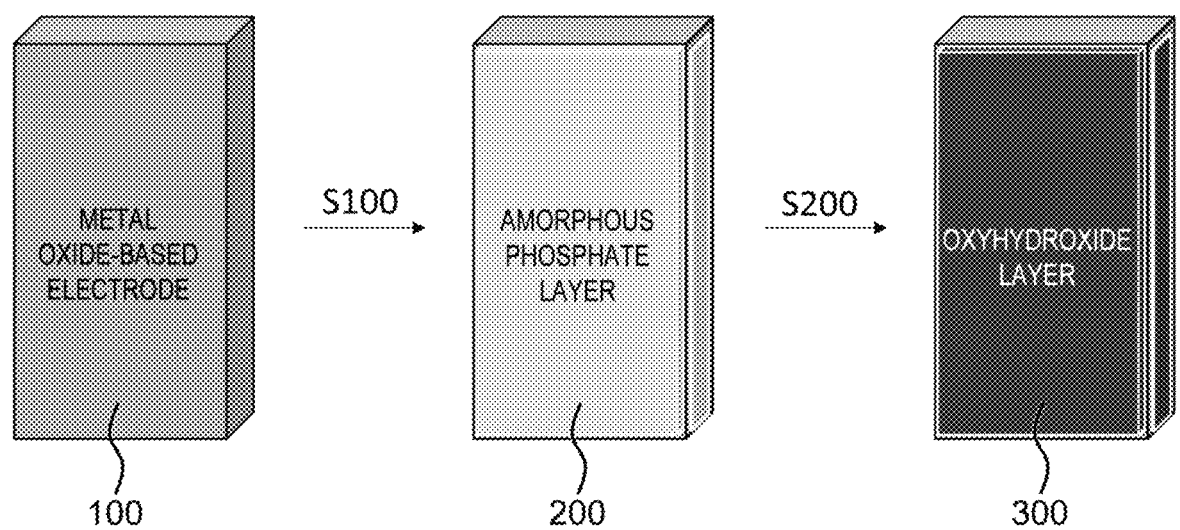
FIG. 3 is a diagram illustrating a method of preparing a photoelectrochemical and electrochemical electrode catalyst, according to an embodiment of the present invention.

FIG. 3 is a diagram illustrating a method of preparing a photoelectrochemical and electrochemical electrode catalyst, according to an embodiment of the present invention. Hereinafter, a method of preparing a photoelectrochemical and electrochemical electrode catalyst is described with reference to FIGS. 2 and 3.

A method of preparing a photoelectrochemical and electrochemical electrode catalyst provided by an embodiment of the present invention may include preparing a metal oxide-based electrode 100, introducing an amorphous phosphate layer 200 on a surface of the electrode (step S100), and converting the amorphous phosphate layer into an oxyhydroxide layer 300 (step S200).

The oxyhydroxide layer produced through the amorphous phosphate layer is realized to have a disordered amorphous structure on the surface of the electrode, and increases the selectivity of ammonia oxidation reaction through the disordered amorphous structure.

In addition, in the introducing of the amorphous phosphate layer on the surface of the metal oxide-based electrode (step S100), a chemical vapor deposition (CVD) process may be used, and the amorphous phosphate layer may have a thickness of 1 nm to 10 nm.

In addition, in the CVD process, the thickness and uniformity of the amorphous phosphate layer may be controlled according to conditions such as the amount of precursor, reaction temperature, reaction pressure, and reaction time, and accordingly, catalytic characteristics and performance of the photoelectrochemical and electrochemical electrode catalyst which is a final product may be controlled.

In addition, in the converting of the amorphous phosphate layer into the oxyhydroxide layer (step S200), an electrochemical activation process may be used. The phosphate layer may have an amorphous structure by reacting with a hydroxide ion in an electrolyte through the electrochemical activation process.

In addition, catalytic characteristics and performance of the photoelectrochemical and electrochemical electrode catalyst may also be controlled by controlling an applied potential window in the electrochemical activation process, the number of repeated executions, the type of the electrolyte, and the like.

In addition, the phosphate layer may include an amorphous structure, and the oxyhydroxide layer may include a disordered amorphous structure.

Hereinafter, an embodiment of the present invention is described in detail with reference to the accompanying drawings. However, the present invention is not limited to the following Examples and Experimental Examples.

Preparation Example 1

In Preparation Example 1, a photoelectrochemical and electrochemical electrode catalyst using a rhombohedral iron oxide ($Fe_2O_3$) ($\alpha$-$Fe_2O_3$)-based electrode was prepared.

In Preparation Example 1, preparing an iron oxide based electrode through hydrothermal synthesis, preparing a FePi/$Fe_2O_3$-based electrode by uniformly depositing an amorphous iron phosphate layer (FePi layer) on a surface of the prepared iron oxide-based electrode through a CVD process, and converting a phosphate layer of the prepared FePi/$Fe_2O_3$-based electrode into a form of iron oxyhydroxide (FeOOH) through an electrochemical activation process were carried out, thereby preparing the photoelectrochemical and electrochemical electrode catalyst of A-FePi/$Fe_2O_3$. A detailed preparing process is as follows.

Preparation Example 1.1

In Preparation Example 1.1, an iron oxide-based electrode was prepared through hydrothermal synthesis. A detailed preparation process is as follows.

1) Prepare 30 ml of aqueous solution containing 1.35 g of iron chloride hexahydrate ($FeCl_3 \cdot 6H_2O$) and 0.9 g of urea.

2) Perform hydrothermal synthesis for six hours at 110° C. in an electrical oven after putting the above aqueous solution into a Teflon autoclave reactor with a capacity of 50 ml.

3) Perform heat treatment for two hours at 550° C. in an electric furnace, followed by heat treatment for 20 minutes at 800° C.

Through the above process, an $\alpha$-$Fe_2O_3$-based electrode was finally synthesized.

Preparation Example 1.2

In Preparation Example 1.2, an amorphous iron phosphate layer was uniformly deposited, through a CVD process, on a surface of the $\alpha$-$Fe_2O_3$-based electrode synthesized through Preparation Example 1.1, thereby synthesizing a FePi/$Fe_2O_3$-based electrode. A detailed preparing process is as follows.

1) Place 50 mg of sodium hypophosphite monohydrate ($NaH_2PO_2 \cdot H_2O$) to be apart from the $\alpha$-$Fe_2O_3$-based electrode by a certain distance while appropriately apart from a gas outlet within a deposition tube.

2) Next, perform a heat treatment process at 300° C. for two hours in an argon (Ar) atmosphere.

Through the above process, finally, the amorphous iron phosphate layer was uniformly deposited on the surface of the $\alpha$-$Fe_2O_3$-based electrode, thereby synthesizing a FePi/$Fe_2O_3$-based electrode.

Preparation Example 1.3

In Preparation Example 1.3, the iron phosphate layer which is an amorphous phosphate layer deposited through Preparation Example 1.2 was converted into a form of an iron oxyhydroxide (FeOOH) layer through an electrochemical activation process.

As a detailed preparing method, cyclic voltammetry (CV) was repeated several times using, as an electrolyte, 1 M aqueous sodium hydroxide (NaOH) solution having a pH of 14. In addition, the above process was carried out in a three-electrode system, wherein the FePi/Fe$_2$O$_2$-based electrode synthesized in Preparation Example 1.1 and 1.2 was used as a working electrode, platinum (Pt) was used as a counter electrode, and an Hg/HgO electrode for alkaline solution was used as a reference electrode.

Through the above process, an activated FePi/Fe$_2$O$_3$ photoelectrochemical and electrochemical electrode catalyst (A-FePi/Fe$_2$O$_3$) was prepared.

Experimental Example 1

In Experimental Example 1, in order to check whether the FePi layer was uniformly deposited, through the CVD process, on the surface of the α-Fe$_2$O$_3$-based electrode to a thickness of several nanometers in the photoelectrochemical and electrochemical electrode catalyst including the FePi/α-Fe-based electrode (A-FePi/Fe$_2$O$_3$) prepared in Preparation Example 1, analysis was performed by using a field emission scanning electron microscope (FESEM), a high-resolution transmission electron microscope (HRTEM), and an energy dispersive spectroscopy (EDS) elemental mapping through a high-angle annular dark-field scanning transmission electron microscopy (HAADF-STEM).

Figure 4:
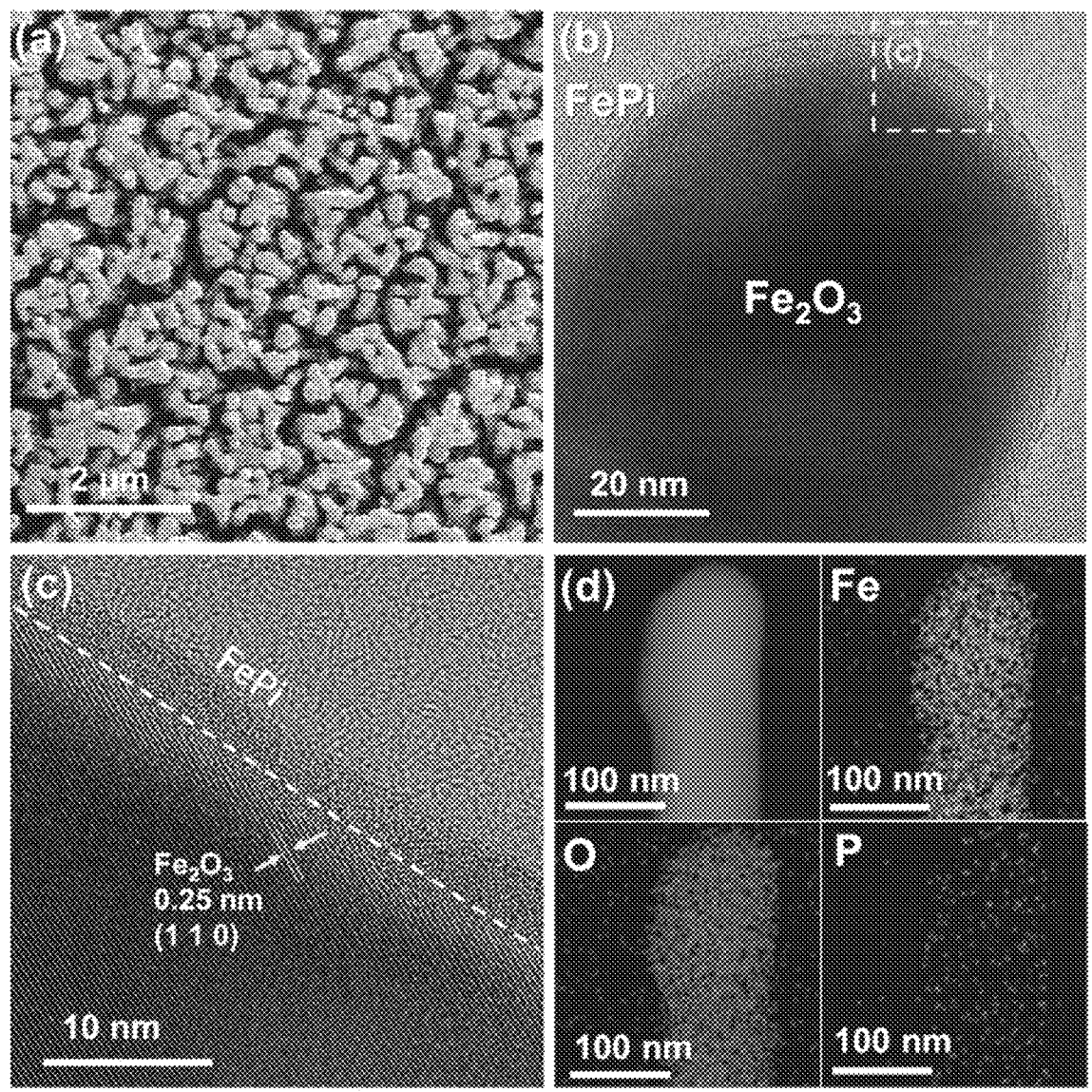
FIG. 4 is a diagram showing a high-magnification SEM image (a) for observing whether a phosphate thin film layer is introduced on a surface of an electrode and a change in a nano-morphology of the electrode, HRTEM images (b) and (c) of a FePi/Fe$_2$O$_3$ electrode, (d) of an HAADF-STEM image (in the upper left), and the measurement of elemental distribution through EDS.

FIG. 4 is a diagram showing a high-magnification FESEM image (a) for observing whether a phosphate thin film layer is introduced on a surface of an electrode and a change in a nano-morphology of the electrode, HRTEM images (b) and (c) of a FePi/Fe$_2$O$_3$ electrode, an HAADF-STEM image in the upper left of (d), and the measurement of elemental distribution through EDS. Hereinafter, the present experimental example is described with reference to FIG. 4.

As shown in (a) of FIG. 4, as a result of FESEM analysis of the FePi/Fe$_2$O$_3$-based electrode synthesized in Preparation Example 1, it was identified that the electrode had a nanorod structure shape similar to that of the α-Fe$_2$O$_3$-based electrode rather than a heteromorphic structure different from that of the α-Fe$_2$O$_3$-based electrode.

In addition, as shown in (b) and (c) of FIG. 4, it could be identified that in the HRTEM image of the electrode, the amorphous FePi thin film having a thickness of about 5 nm is uniformly coated on the surface of the α-Fe$_2$O$_3$-based electrode, which is a (110) surface in which a distance of a lattice fringe is 0.25 nm indicating α-Fe$_2$O$_3$, and phosphate ions were successfully deposited on the surface of the electrode.

In addition, as shown in (d) of FIG. 4, the result could be re-identified through EDS elemental mapping.

Experimental Example 2

In Experimental Example 2, a change in the binding state between elements on the surface of the electrode before and after the introduction of a metal phosphate thin film layer was analyzed.

Figure 5:
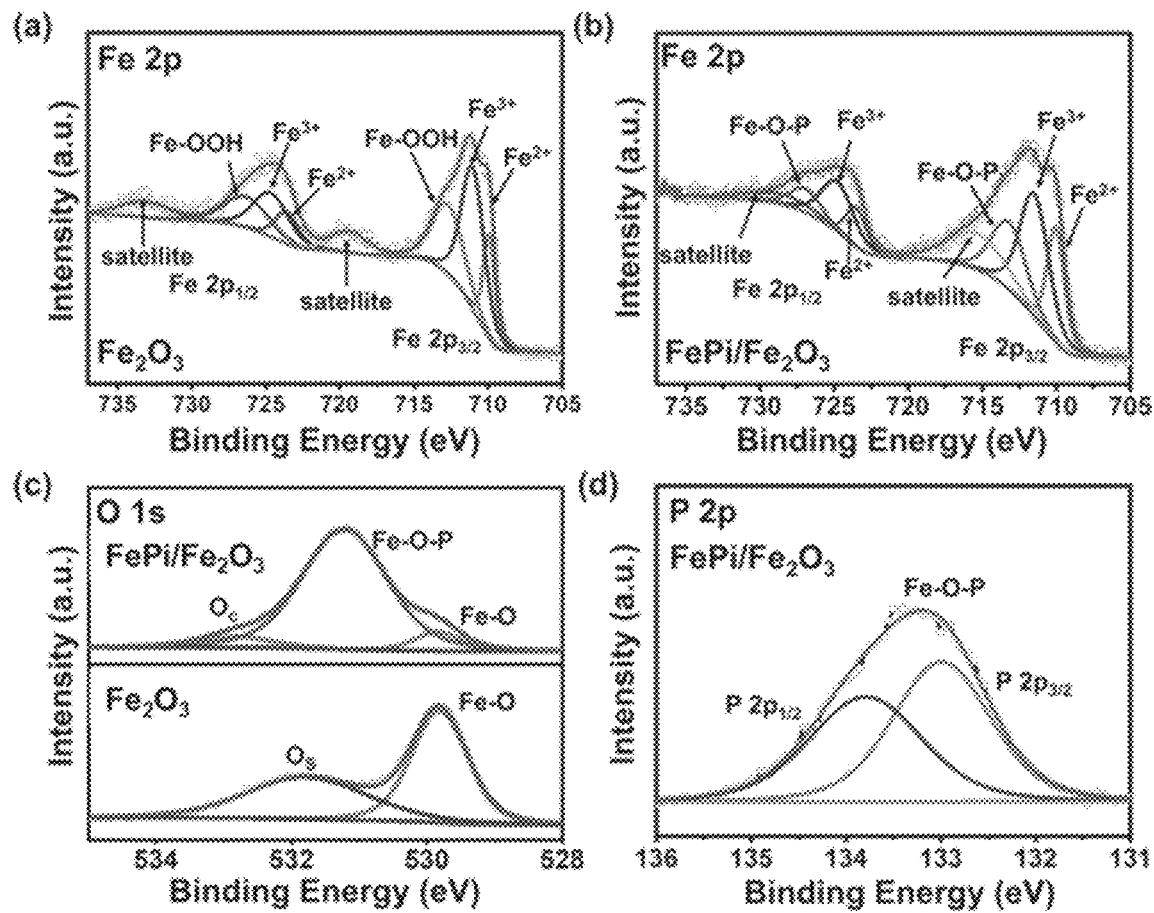
FIG. 5 is a diagram showing a high-resolution XPS spectrum (a) of Fe 2p with respect to a Fe$_2$O$_3$-based electrode, a high-resolution XPS spectrum (b) of Fe 2p with respect to a FePi/Fe$_2$O$_3$ electrode, a high-resolution XPS spectrum (c) of O 1s with respect to the Fe$_2$O$_3$ and FePi/Fe$_2$O$_2$ electrodes, and a high-resolution XPS spectrum (d) of P 2p with respect to the FePi/Fe$_2$O$_3$ electrode, experimented in Experimental Example 2.

FIG. 5 is a diagram showing a high-resolution XPS spectrum of Fe 2P (a) with respect to the Fe$_2$O$_3$-based electrode, a high-resolution XPS spectrum of Fe 2p (b) with respect to the FePi/Fe$_2$O$_3$ electrode, a high-resolution XPS spectrum of O 1s (c) with respect to the Fe$_2$O$_3$ and FePi/Fe$_2$O$_3$ electrodes, and a high-resolution XPS spectrum of P 2p (d) with respect to the FePi/Fe$_2$O$_3$ electrode, experimented in Experimental Example 2. Hereinafter, Experimental Example 2 is described with reference to FIG. 5.

As shown in FIG. 5, the Fe—O—P bond, which was not observed before the introduction of the metal phosphate thin film layer, was identified in (b), (c), and (d) of FIG. 5 after the introduction thereof, and in particular, in (c) of FIG. 5, in Fe-Pi/Fe$_2$O$_3$, the Fe—O—P bond was observed more dominantly than the Fe—O bond. Accordingly, it could be identified that phosphate ions were successfully deposited on the electrode surface to form bonds.

Experimental Example 3

In Experimental Example 3, changes in the bonding state between elements on the surface of the electrode in response to the FePi phosphate layer, which was introduced on the surface of the α-Fe$_2$O$_3$-based electrode, undergoing electrochemical activation were measured.

Figure 6:
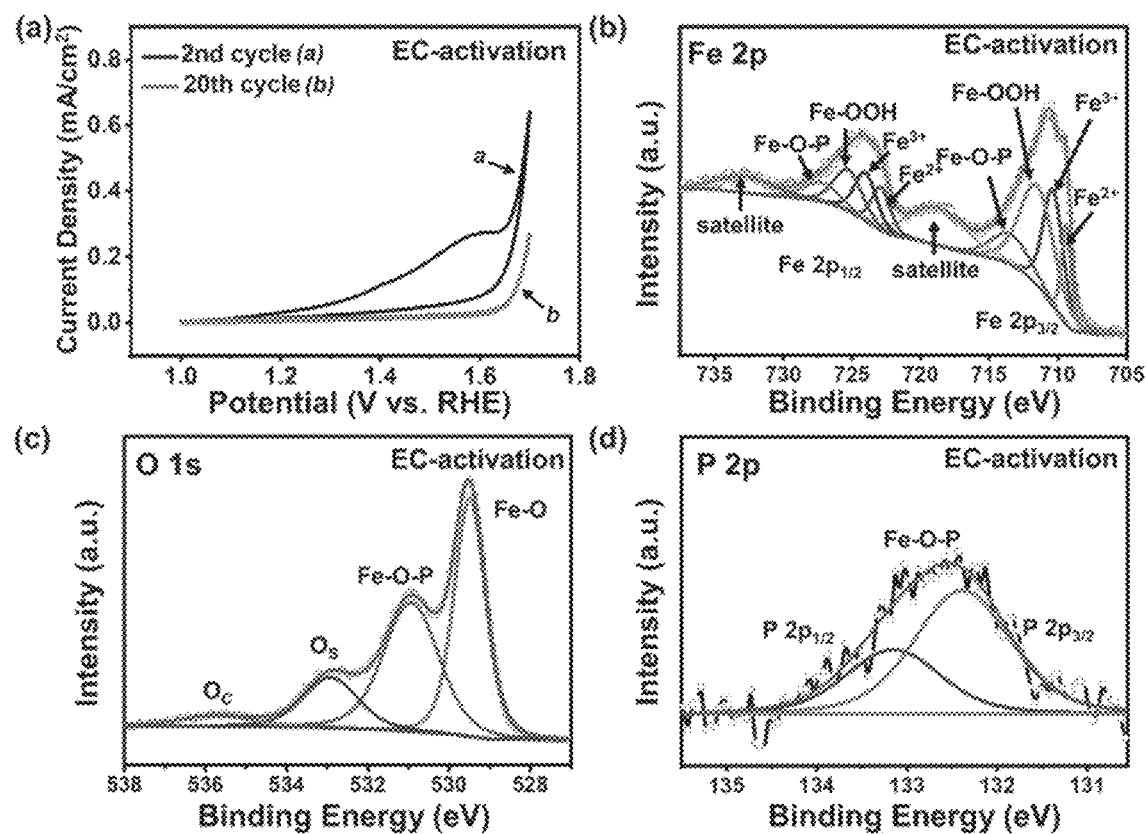
FIG. 6 is a diagram showing an experiment result of Experimental Example 3.

FIG. 6 is diagram showing an experiment result of Experimental Example 3. Hereinafter, changes in the bonding state between elements on the surface of the electrode in response to electrochemical activation is described with reference to FIG. 6.

As shown in FIG. 6, a cyclic voltammetry (CV) graph repeated 20 times of the electrode catalyst (A-FePi/Fe$_2$O$_3$) that was electrochemically activated form of FePi/Fe$_2$O$_3$ electrode in (a) of FIG. 6 was analyzed, and the PS spectrum are shown in (b), (c), and (d) of FIG. 6. As a result of the electrochemical activation, unlike FePi/Fe$_2$O$_3$ identified in FIG. 5, as the bonding state between the elements on the surface of the electrode, the Fe—OOH bond indicating the oxyhydroxide layer was observed in (b) of FIG. 6. In particular, as shown in (c) of FIG. 6, it could be identified that the iron oxyhydroxide (FeOOH) layer was successfully introduced by a dominant change in the Fe—O bond rather than the Fe—O—P bond after the electrochemical activation.

Experimental Example 4

In Experimental Example 4, in order to identify that photoelectrochemical catalytic characteristics of the A-FePi/Fe$_2$O$_3$ photoelectrochemical and electrochemical electrode catalyst synthesized in Preparation Example 1 is selective for ammonia oxidation reaction compared to competitive water oxidation reaction, a photoelectrochemical response current according to the presence or absence of ammonia in the electrolyte was identified by cyclic voltammetry.

Figure 7:
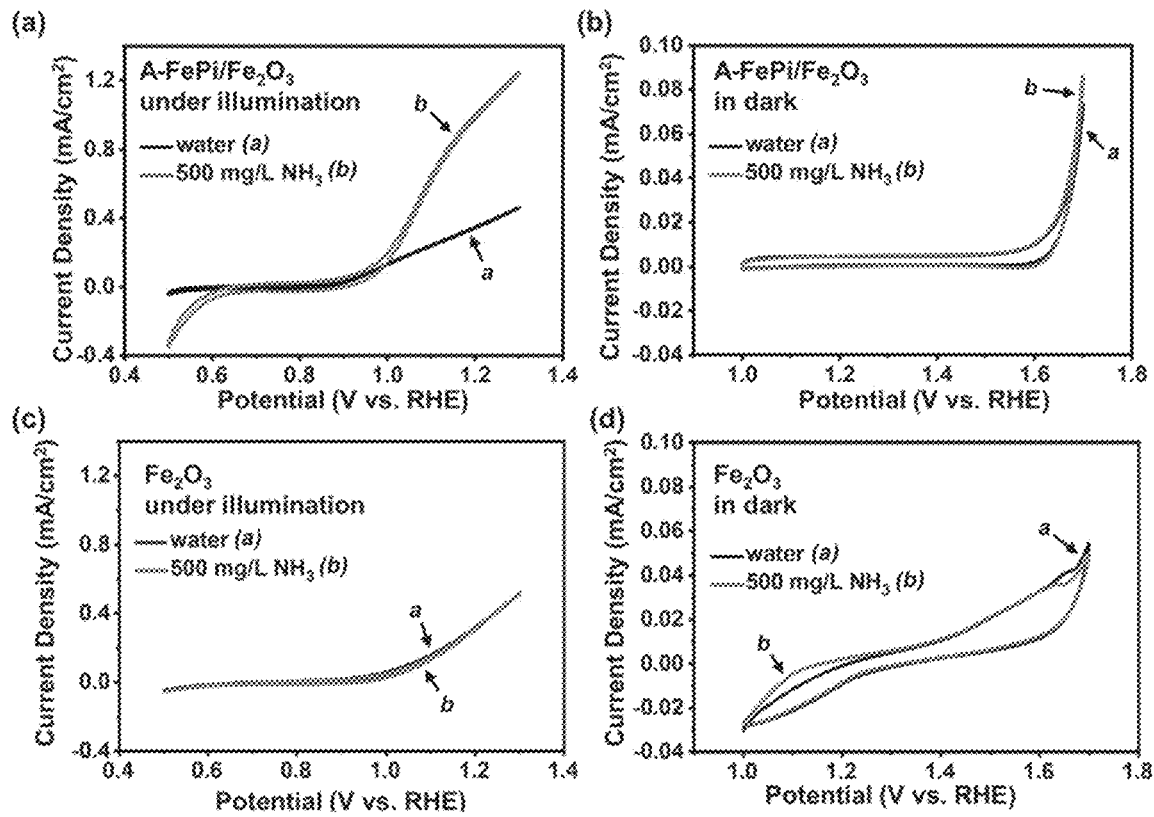
FIG. 7 is a diagram showing experiment results identifying catalytic activity for ammonia oxidation reaction of Experimental Example 4, and is a diagram showing CV graphs according to the presence or absence of ammonia in an electrolyte under a light irradiation condition (a) and dark condition (b) of an A-FePi/Fe$_2$O$_3$ photoelectrochemical and electrochemical electrode catalyst, and under a light irradiation condition (c) and dark condition (d) of a Fe$_2$O$_2$ electrode.

FIG. 7 is a diagram showing an experiment result in which catalytic activity for ammonia oxidation reaction of Experimental Example 4 was identified, and is a diagram showing CV graphs according to the presence or absence of ammonia in the electrolyte under a light irradiation condition (a) and dark condition (b) of the A-FePi/Fe$_2$O$_3$ photoelectrochemical and electrochemical electrode catalyst, and under a light irradiation condition (c) and dark condition (d) of the Fe$_2$O$_3$-based electrode.

Figure 8:
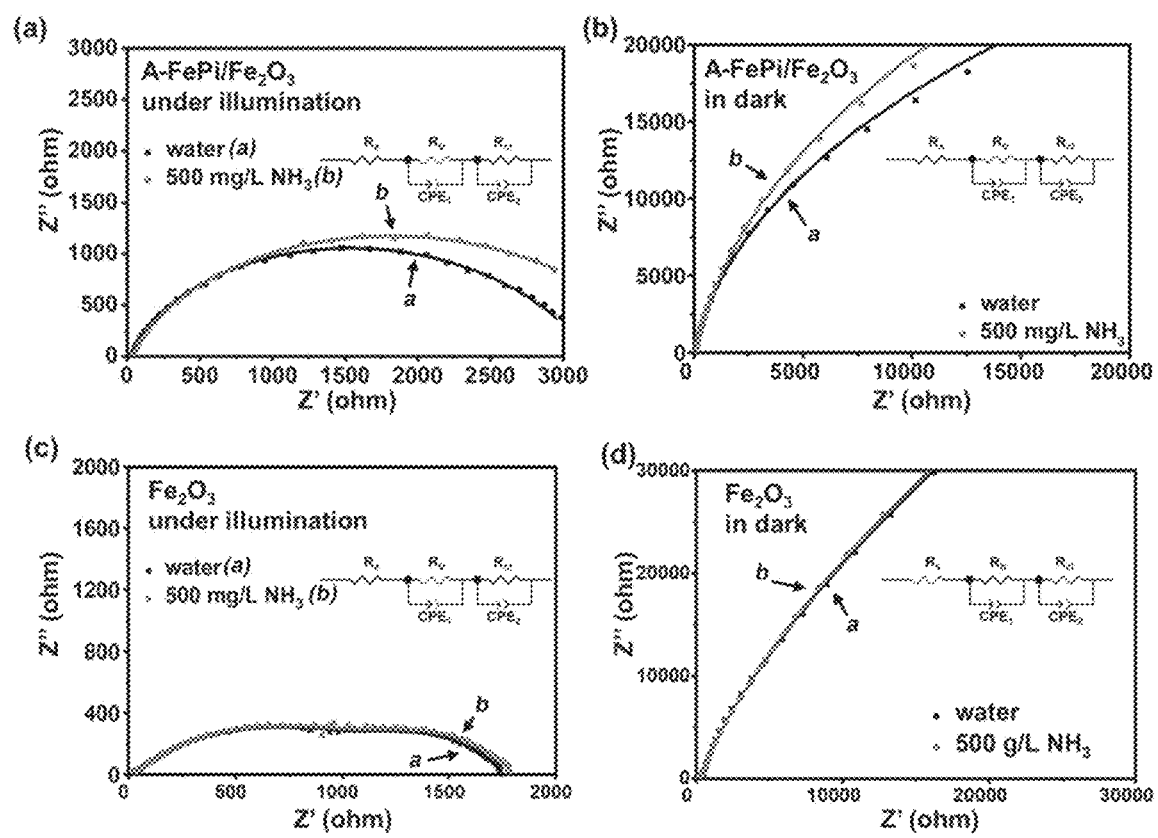
FIG. 8 is a diagram showing Nyquist plot according to the presence or absence of ammonia in an electrolyte under a light irradiation condition (a) and dark condition (b) of an A-FePi/Fe$_2$O$_3$ photoelectrochemical and electrochemical electrode catalyst, and under a light irradiation condition (c) and dark condition (d) of a Fe$_2$O$_3$ electrode, through electrochemical impedance spectroscopy of Experimental Example 4.

FIG. 8 is a diagram showing Nyquist plot according to the presence or absence of ammonia in the electrolyte under a light irradiation condition (a) and dark condition (b) of the A-FePi/Fe$_2$O$_3$ photoelectrochemical and electrochemical electrode catalyst, and under a light irradiation condition (c) and dark condition (d) of the Fe$_2$O$_3$-based electrode through electrochemical impedance spectroscopy (EIS) of Experimental Example 4.

Hereinafter, descriptions are made with reference to FIGS. 7 and 8.

In Experimental Example 4, variation of charge transfer resistance $R_{ct}$ was identified by deriving Nyquist plot through EIS in order to identify improvement of electrode catalyst surface reaction performance. 0.1 M aqueous sodium hydroxide solution was used as a reference electrolyte, and accordingly, catalytic characteristics for water oxidation reaction could be identified.

In order to identify catalytic characteristics for ammonia oxidation reaction, 0.1 M aqueous sodium hydroxide solution in which concentration of ammonia ions was 550 ppm by adding ammonium solution to the reference electrolyte was used. In a three-electrode system, the A-FePi/Fe$_2$O$_3$ photoelectrochemical and electrochemical electrode catalyst was used as a working electrode, platinum (Pt wire) was used as a counter electrode, and a Hg/HgO electrode for alkaline solution was used as a reference electrode.

As a result of cyclic voltammetry experiment, when light was irradiated onto the A-FePi/Fe$_2$O$_2$ photoelectrochemical and electrochemical electrode catalyst, the electrolyte to which ammonia was added had a higher current density than that of the reference electrolyte, and accordingly, characteristics of the electrode catalyst as a photoelectrochemical ammonia oxidation reaction catalyst were identified.

In addition, as a result of the EIS experiment, it was identified through the Nyquist plot that in the case of the Fe$_2$O$_3$-based electrode, there was no difference in open forms of semicircles depending on the electrolyte, whereas in the case of the A-FePi/Fe$_2$O photoelectrochemical and electrochemical electrode catalyst, semicircles became larger in the electrolyte to which ammonia was added. Through the increased $R_{ct}$ value of the A-FePi/Fe$_2$O$_3$ photoelectrochemical and electrochemical electrode catalyst, it was identified that catalytic characteristics were improved so that ammonia could be adsorbed competitively with water on the surface of the electrode by applying the technique of the present invention.

Experimental Example 5

In Experimental Example 5, the degree of decomposition over time was measured using UV-Visible spectroscopy (UV-VIS) equipment in order to identify photo-catalytic (PC), electro-catalytic (EC), and photoelectrochemical-catalytic (PEC) ammonia oxidation performance of the A-FePi/Fe$_2$O$_3$ photoelectrochemical and electrochemical electrode catalyst.

Figure 9:
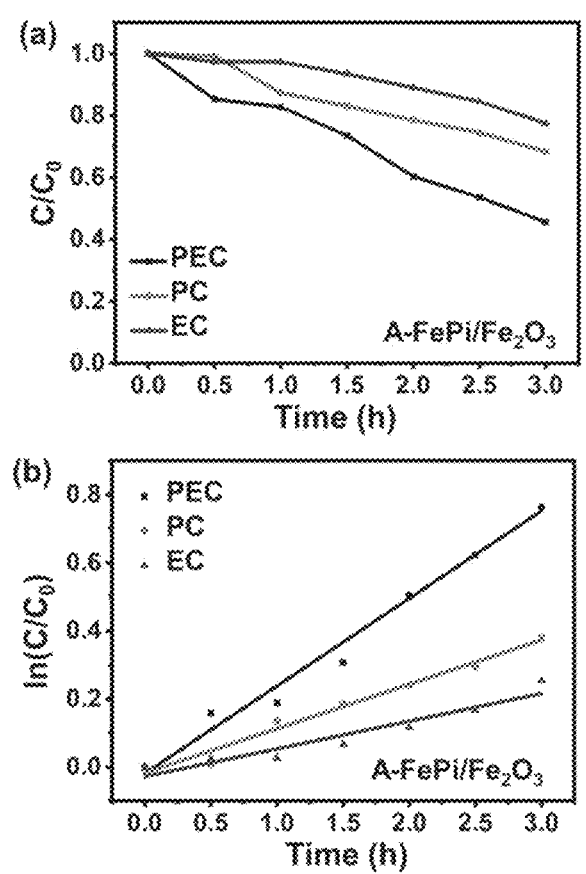
FIG. 9 is a diagram showing graphs, each under each condition of Experimental Example 5, in which (a) of FIG. 9 is a degree of ammonia decomposition over time of an A-FePi/Fe$_2$O$_3$ photoelectrochemical and electrochemical electrode catalyst, and (b) of FIG. 9 is a linearization of a degree of ammonia decomposition over time thereof using natural logarithm.

FIG. 9 is a diagram showing graphs, in which (a) of FIG. 9 is a degree of ammonia decomposition over time of the A-FePi/Fe$_2$O$_3$ photoelectrochemical and electrochemical electrode catalyst, and (b) of FIG. 9 is linearization of a degree of ammonia decomposition over time thereof using natural logarithm, each under each condition of Experimental Example 5.

Hereinafter, Experimental Example 5 is described with reference to FIG. 9.

In Experimental Example 5, the experiment was conducted to identify a reaction rate order and reaction coefficient of the electrode with respect to PEC, PC, and EC ammonia oxidation reaction, and as shown in FIG. 9, as a result of the PEC ammonia oxidation experiment, about 54.4% of ammonia was decomposed for three hours at 1.23 V based on RHE, and about 32.0% of ammonia was decomposed in the PC experiment, and about 22.6% of ammonia was decomposed in the EC experiment, showing a suitable aspect as the photoelectrochemical catalyst.

Experimental Example 6

In Experimental Example 6, an experiment was conducted to evaluate stability and performance of the A-FePi/Fe$_2$O$_3$ photoelectrochemical and electrochemical electrode catalyst against ammonia oxidation for a long period of time.

Figure 10:
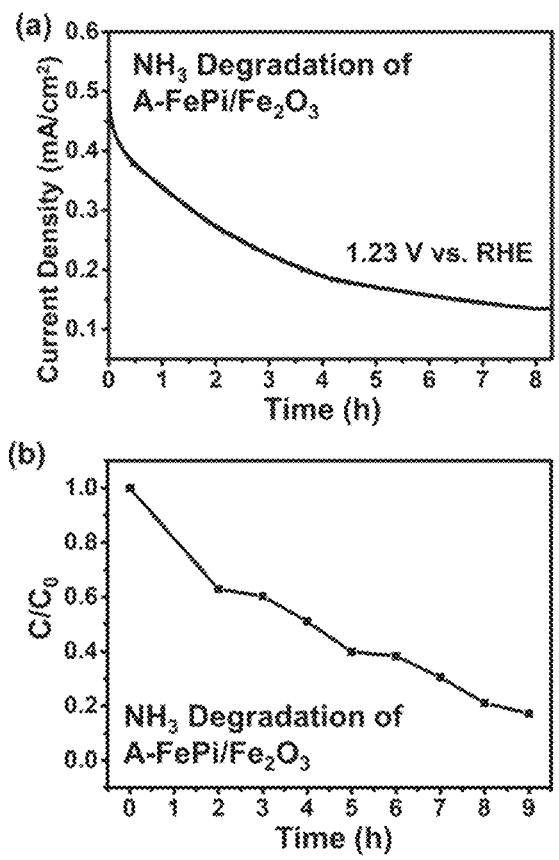
FIG. 10. is a diagram showing graphs, each under PEC condition, in which (a) of FIG. 10 is a variation of current density over time of an A-FePi/Fe$_2$O$_3$ photoelectrochemical and electrochemical electrode catalyst, and (b) of FIG. 10 is a degree of ammonia decomposition over time thereof.

FIG. 10. is a diagram showing graphs, in which (a) of FIG. 10 is a variation of current density over time of the A-FePi/Fe$_2$O$_3$ photoelectrochemical and electrochemical electrode catalyst, and (b) of FIG. 10 is a degree of ammonia decomposition over time thereof, each under PEC condition. Hereinafter, descriptions are made with reference to FIG. 10.

As shown in FIG. 10, the A-FePi/Fe$_2$O$_3$ photoelectrochemical and electrochemical electrode catalyst showed removal efficiency close to 80% in the PEC ammonia oxidation experiment performed for 9 hours when the ammonia oxidation reaction was carried out for a long period of time. In addition, as the reaction proceeded, concentration of ammonia in the electrolyte decreased to less than or equal to a certain level, and then, competition with water oxidation reaction was intensified such that a reaction constant had a tendency to decrease.

Experimental Example 7

In Experimental Example 7, the changed bonding state between elements on the surface of the electrode after the ammonia oxidation reaction was analyzed.

Figure 11:
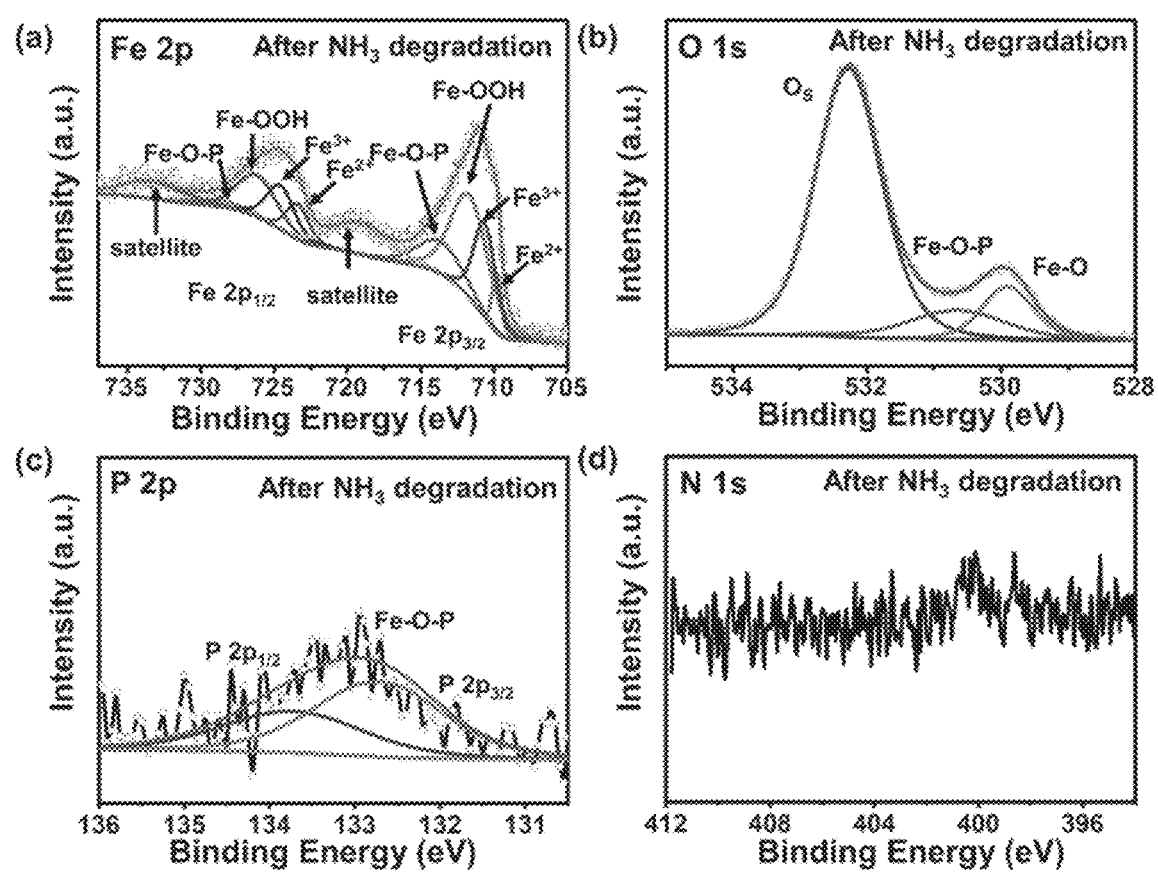
FIG. 11 is a diagram showing a high-resolution XPS spectrum (a) of Fe 2p of an A-FePi/Fe$_2$O$_3$ photoelectrochemical and electrochemical electrode catalyst after ammonia oxidation reaction, a high-resolution XPS spectrum (b) of O 1s thereof, a high-resolution XPS spectrum (c) of P 2p thereof, a high-resolution XPS spectrum (d) of N is thereof.

FIG. 11 is a diagram showing a high-resolution XPS spectrum of Fe 2p (a) of the A-FePi/Fe$_2$O$_3$ photoelectrochemical and electrochemical electrode catalyst, a high-resolution XPS spectrum of O 1s (b) thereof, a high-resolution XPS spectrum of P 2p (c) thereof, a high-resolution XPS spectrum of N 1s (d) thereof, each after the ammonia oxidation reaction. Hereinafter, descriptions are made with reference to FIG. 11.

As shown in FIG. 11, after the ammonia oxidation reaction, it was identified that the A-FePi/Fe$_2$O$_3$ photoelectrochemical and electrochemical electrode catalyst was as stable electrode without a poisoning phenomenon deteriorating performance due to bonding of nitrogen onto the surface of the A-FePi/Fe$_2$O$_3$ photoelectrochemical and electrochemical electrode catalyst.

In addition, through O 1s spectrum (b) and P 2p spectrum (c), it was identified that the iron phosphate was continuously converted into iron oxyhydroxide during the ammonia oxidation reaction process. Accordingly, it could be identified that the surface of the electrode continued to provide an active site to which ammonia can be adsorbed, thereby allowing the reaction to continue for a long period of time.

Comparative Example 1

In Comparative Example 1, the catalytic activity for ammonia oxidation reaction of the electrode without electrochemical activation after the introduction of the metal phosphate thin film layer was identified.

Figure 12:
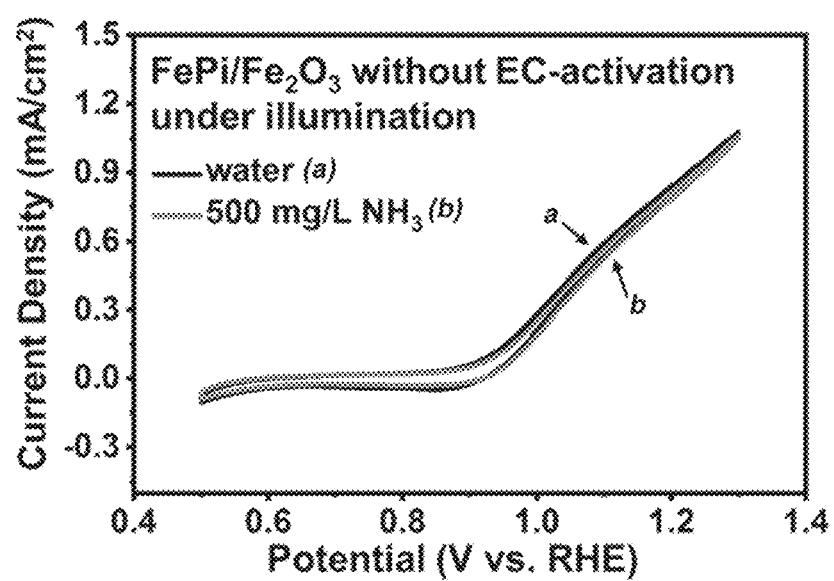
FIG. 12 is a diagram showing a CV graph according to the presence or absence of ammonia in an electrolyte with respect to a FePi/Fe$_2$O$_3$ electrode.

FIG. 12 is a diagram showing a CV graph according to the presence or absence of ammonia within the electrolyte with respect to the FePi/Fe$_2$O$_3$ electrode. Hereinafter, descriptions are made with reference to FIG. 12.

In Comparative Example 1, the FePi/Fe$_2$O$_3$ electrode without the electrochemical activation process was synthesized to identify the necessity of the electrochemical activation process, which is the purpose of this experiment, and a photoelectrochemical response current according to the presence or absence of ammonia within the electrolyte was identified by cyclic voltammetry.

As a result of the experiment, when light was irradiated, the response current appeared similar regardless of the presence or absence of ammonia within the electrolyte, and thus, it was identified that there was no selective catalytic characteristics for the ammonia oxidation reaction.

In other words, it was identified that the electrochemical activation process was a necessary step to exhibit characteristics of the ammonia oxidation catalyst in combination with the introduction of the amorphous phosphate layer.

Comparative Example 2

In Comparative Example 2, the catalytic activity for ammonia oxidation reaction after electrochemical activation of the electrode without the metal phosphate thin film layer was identified in order to identify the necessity of the introduction of phosphate, which is the purpose of this experiment.

Figure 13:
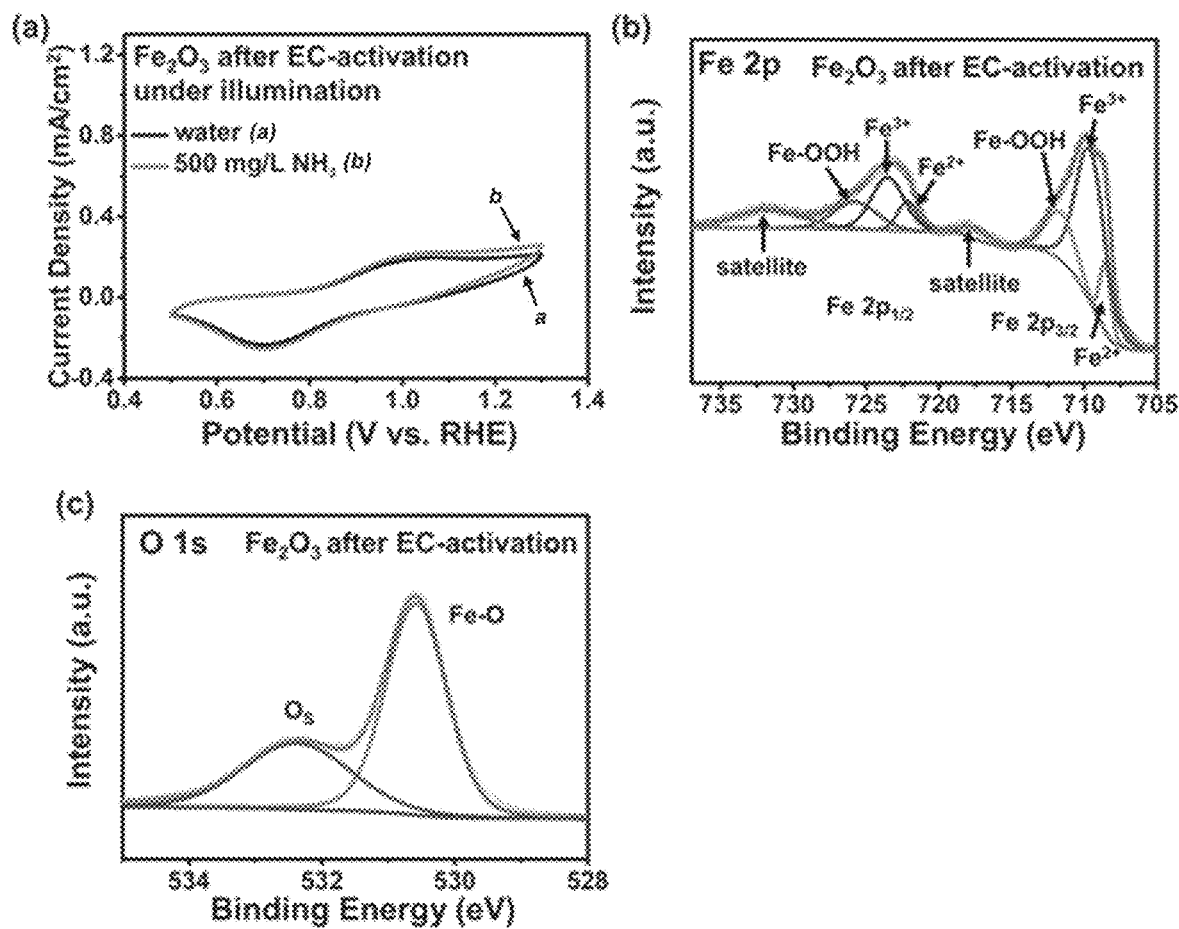
FIG. 13 is a diagram showing a CV graph (a) according to the presence or absence of ammonia in an electrolyte with respect to the A-Fe$_2$O$_3$ electrode, a high-resolution XPS spectrum (b) of Fe 2p thereof, and a high-resolution XPS spectrum (c) of O 1s thereof.

FIG. 13 is a diagram showing a CV graph (a) according to the presence or absence of ammonia within the electrolyte with respect to the A-$Fe_2O_3$ electrode, a high-resolution XPS spectrum of Fe 2p (b), and a high-resolution XPS spectrum of O 1s (c). Hereinafter, descriptions are made with reference to FIG. 13.

As shown in FIG. 13, in the case of the electrode without the metal phosphate thin film layer, in a case where the ammonia oxidation reaction proceeded after the electrochemical activation process, the response current appeared similar regardless of the presence or absence of ammonia within the electrolyte when light was irradiated, and thus, it was identified that there were no selective catalytic characteristics for the ammonia oxidation reaction. Also, it could be identified that the bonding state between elements on the electrode surface also showed the same characteristics as the $Fe_2O_3$-based electrode described above.

In other words, it was identified that the introduction of the amorphous phosphate layer was a necessary step to express characteristics of the ammonia oxidation catalyst in combination with the electrochemical activation process.

According to an embodiment of the present invention, when a transition metal oxide-based electrode absorbs sunlight, an electron-hole pair is formed, and an effect of exhibiting characteristics suitable for water ($H_2O$) oxidation reaction may be provided.

In addition, according to an embodiment of the present invention, an oxyhydroxide layer may provide an effect of tuning the catalytic characteristics of a metal oxide-based electrode suitable for water ($H_2O$) oxidation reaction to have selective characteristics for ammonia ($NH_3$) oxidation reaction.

The effects of the present invention are not limited to the above-described effects, and it should be understood that the effects include all effects that can be inferred from the configuration of the invention described in the detailed description of the invention or the claims.

The above description of the present invention is for illustration, and those of ordinary skill in the art to which the present invention pertains can understand that it can be easily modified into other specific forms without changing the technical spirit or essential features of the present invention. Therefore, it should be understood that the embodiments described above are illustrative in all respects and not restrictive. For example, each element described as a single type may be implemented in a distributed form, and likewise elements described as distributed may be implemented in a combined form.

The scope of the present invention is indicated by the following claims, and all changes or modifications derived from the meaning and scope of the claims and their equivalents should be construed as being included in the scope of the present invention.

DESCRIPTION OF REFERENCE NUMERALS

100: metal oxide-based electrode
200: amorphous phosphate layer
300: oxyhydroxide layer

What is claimed is:

1. A method of preparing a photoelectrochemical and electrochemical electrode catalyst, the method comprising:
   preparing a metal oxide-based electrode;
   introducing a phosphate layer on a surface of the metal oxide-based electrode; and
   converting the phosphate layer into an oxyhydroxide layer by performing electrochemical activation on the phosphate layer.

2. The method of claim 1, wherein the metal oxide-based electrode comprises iron oxide.

3. The method of claim 2, wherein the iron oxide has a rhombohedral structure.

4. The method of claim 1, wherein the oxyhydroxide layer has a thickness of 1 nm to 10 nm.

5. The method of claim 1, wherein the phosphate layer comprises an iron phosphate layer containing iron monoxide.

6. The method of claim 1, wherein the phosphate layer comprises an amorphous structure.

7. The method of claim 1, wherein the oxyhydroxide layer comprises iron oxyhydroxide.

8. The method of claim 1, wherein the oxyhydroxide layer comprises a disordered amorphous structure.

9. A photoelectrochemical and electrochemical electrode catalyst comprising:
   a metal oxide-based electrode; and
   as oxyhydroxide layer disposed on a surface of the electrode,
   wherein the oxyhydroxide layer comprises a disordered amorphous structure.

10. The photoelectrochemical and electrochemical electrode catalyst of claim 9, wherein the oxyhydroxide layer has a thickness of 1 nm to 10 nm.

11. The photoelectrochemical and electrochemical electrode catalyst of claim 9, wherein the metal oxide-based electrode comprises iron oxide.

12. The photoelectrochemical and electrochemical electrode catalyst of claim 11, wherein the iron oxide has a rhombohedral structure.

13. The photoelectrochemical and electrochemical electrode catalyst of claim 9, wherein the oxyhydroxide layer comprises iron oxyhydroxide.

* * * * *